_United States Patent_ [19]

Quigley et al.

[11] 4,196,747
[45] Apr. 8, 1980

[54] FLEXIBLE DRINKING TUBE WITH CHECK VALVE

[76] Inventors: Patrick C. Quigley, 1021 Prouty Way, San Jose, Calif. 95129; Timothy C. Quigley, P.O. Box 311, Grizzly Flats, Calif. 95636

[21] Appl. No.: 932,805

[22] Filed: Aug. 11, 1978

[51] Int. Cl.$^2$ .............................................. F16K 15/03
[52] U.S. Cl. .................. 137/527.8; 128/222; 239/33; 248/79
[58] Field of Search ............ 137/151, 152, 527.8; 128/222, 223, 228; D7/42; 215/1 A; 239/33; 248/79

[56] References Cited

U.S. PATENT DOCUMENTS

| 103,300 | 5/1970 | Chapin | 239/33 |
|---|---|---|---|
| 443,496 | 12/1890 | Bowser et al. | 137/151 X |
| 488,693 | 12/1892 | Lingford et al. | 137/151 X |
| 982,734 | 1/1911 | Martinelli | 128/228 UX |
| 1,556,732 | 10/1925 | Sterrick | 137/152 X |
| 1,813,285 | 7/1931 | Galetschky | 239/33 |
| 2,070,495 | 2/1937 | Strutz et al. | D7/42 X |
| 2,969,064 | 1/1961 | Metz | 128/222 |
| 3,021,860 | 2/1962 | Gandy | 137/152 X |
| 3,538,514 | 11/1970 | Schimert et al. | 137/527.8 X |
| 4,034,780 | 7/1977 | Horvath | 137/151 X |
| 4,095,615 | 6/1978 | Ramsauer | 137/527.8 |

FOREIGN PATENT DOCUMENTS

| 59245 | 10/1891 | Fed. Rep. of Germany | 137/151 |
| 1358848 | 3/1964 | France | 137/527.8 |

_Primary Examiner_—Gerald A. Michalsky
_Attorney, Agent, or Firm_—Julian Caplan

[57] ABSTRACT

Invalids have difficulty sipping water from pitchers and glasses through ordinary straws because of the effort required to lift water through a straw or tube and the fact that upon cessation of sucking the water in the tube runs back into the pitcher or glass. A flap-type check valve is placed in the lower end of the tube. Little effort is required to open the valve. The weight of the water maintains it closed.

3 Claims, 3 Drawing Figures

FLEXIBLE DRINKING TUBE WITH CHECK VALVE

This invention relates to a new and improved flexible drinking tube having a check valve on its lower end. Invalids experience considerable difficulty in sipping liquids unattended. The effort of lifting a glass from the bedside table and raising it to the lips and the further difficulty of controlling the glass during drinking is a great problem for invalids, particularly when very weak. Therefore, tubes have been used so that the vessel may remain on a bedside table and it is merely necessary to suck through the tube to raise water to the mouth. Because of the distance involved, unless a check valve is incorporated in the drinking tube, the effort required to lift the water through the tube is very tiring. Further, if the sucking action is interrupted through lack of breathing capacity, the water runs back down the tube. The various check valves which have been used in such tubes have been unsatisfactory, because lifting the valve member off its seat requires more effort than is desirable. Accordingly, it is the object of the present invention to provide a check valve in a drinking siphon which accommodates the reduced sipping ability of the patient and does not malfunction if the sipping action is interrupted when the patient is required to inhale air.

It is, accordingly, a principal feature of the present invention that the amount of sipping suction required to open the valve is less than in prior check valves used on drinking straws and tubes.

Another feature of the invention is the fact that the valve readily closes when sipping is discontinued and the flapper of the valve seats tightly, preventing liquid from running down the tube.

A still further feature of the invention is the fact that the construction and assembly of the device is very inexpensive so that the device may be disposable, making it unnecessary to sterilize the equipment between uses.

Other objects of the present invention will become apparent upon reading the following specification and referring to the accompanying drawings in which similar characters of reference represent corresponding parts in each of the several views.

Figure 1:
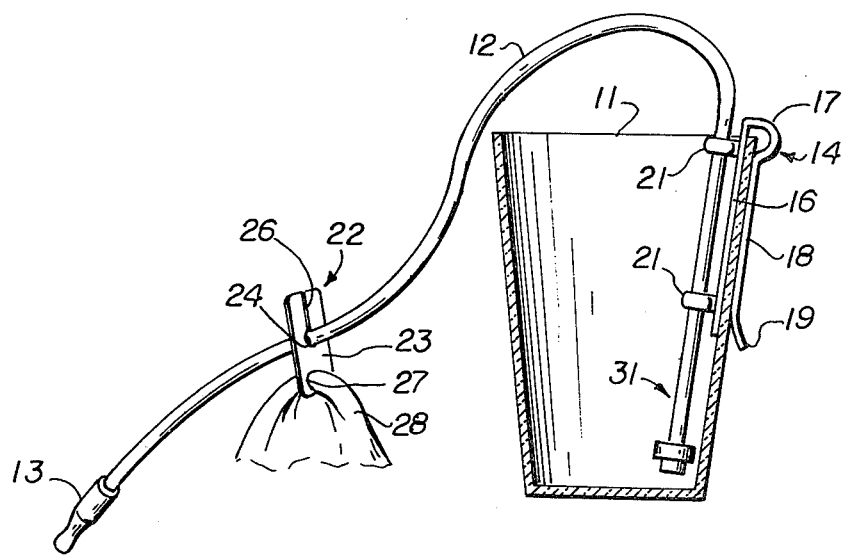
FIG. 1 is a perspective view showing the invention installed in a drinking glass.
Figure 3:
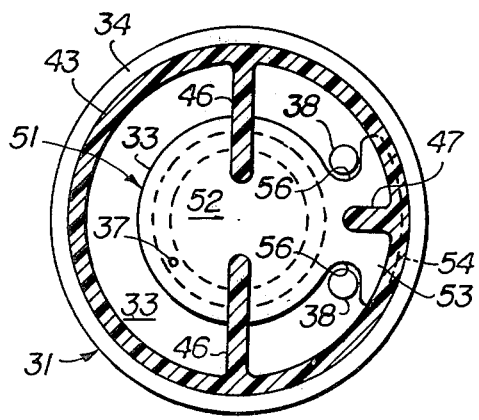
FIG. 3 is a sectional view substantially along the line 3—3 of FIG. 2.

The device of the present invention is intended for use in connection with a vessel 11 which may be a drinking glass, pitcher or other container for any liquid. A flexible plastic tube 12 is provided with a mouthpiece 13 at one end to fit into the patient's mouth. A clip 14 is used to clip the tube 12 on the vessel 11. Clip 14 has an inner leaf 16 which fits against the inside of the wall of the vessel, a bend 17 at its upper end and an outer leaf 18. The function of the bend 17 is to cause the leaves 16 and 18 to fit relatively tightly around the walls of the vessel 11. To assist in installing the clip 14, the lower extremity of outer lip 18 is outwardly curved.

Clip 22 may be used to clip the tube 12 to the patient's gown 28 or bedclothes so that the mouthpiece 13 is convenient for insertion in the mouth. In the form of clip shown, there is a rectangular body 13 having a hole 24 through which the tube 12 fits in such manner that the tube 12 will remain fixed relative to the clip 22 unless deliberately moved. To assist in the installation of the tube 12, a slit 26 is formed extending outward from the hole 24 to one edge of the body 23. On another edge of the body 23 a cardioid opening 27 is formed which is convenient for gripping the gown or bedcovers 28.

On the lower end of tube 12 is a valve 31 which is preferably located so that it is on the bottom of the vessel 11. The eyes 21 attached to the inner leaf 16 of clip 14 locate the valve in proper position. The tube 12 may slide through the eyes 21; but once in position, is not easily moved.

Valve 31 has a lower member 32 having an annular disc 33 with a peripheral flange 34. Extending from disc 33 in a direction opposite flange 34 is nipple 36 which normally rests against the bottom of vessel 11. Above disc 33 is annular valve seat 37. A pair of upper extending studs 38 provide location for the flapper of the valve as hereinafter explained.

Upper member 41 fits into lower member 32. Member 41 has a disc 42 spaced from disc 33 and has a flange 43 which fits inside the flange 34 to form a closed valve body. Nipple 44 receives the lower end of tube 12. On the underside of disc 42 are two valve stops 46 which limit the upper movement of the flapper 51 as shown by the dot-and-dash lines of the flapper in FIG. 2. Against flange 43 and located so as to fit between the studs 38 in the assembled position of the valve is a flapper hold-down 47 which is preferably about 90° from the stops 46. Disc 42 has a central hole 48 in registry with the inside of the tube 12.

Figure 2:
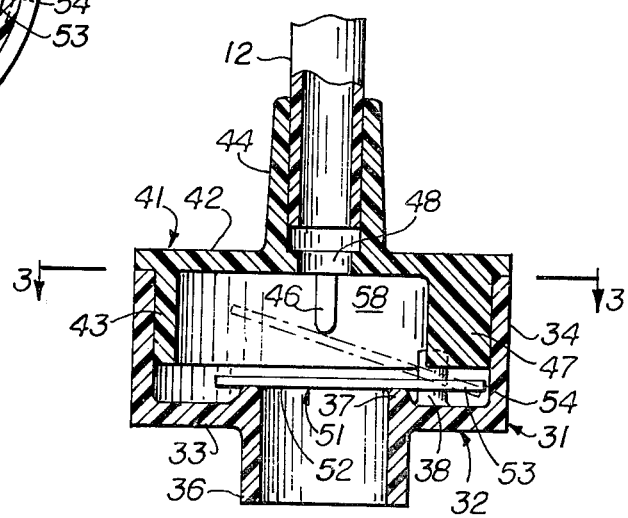
FIG. 2 is an enlarged sectional view through the valve.

Flapper 51 is preferably formed of a silicone type rubber and is sufficiently rigid so that it does not bend but rather wobbles inside the valve body. Thus, flapper 51 has a disc 52 of larger diameter than the seat 37 and has an outward extension 53 having an arcuate edge 54 which is spaced a slight distance from the inside of flange 34. There are two cutouts 56 in extension 53 through which the studs 38 extend. In the assembled position, as shown in FIG. 2, there is a space between the extension 53 and the inner end of flap hold-down 47. Gravity and the weight of the fluid in the tube 12 tend to hold the disc 52 down against the seat 37. However, when the patient sucks on the mouthpiece 13, the flapper 51 tilts from the solid line to the dot-and-dash line position of FIG. 2. The space between the inner end of the hold-down 47 and the plane of the seat 37 permits the tilting action and it will be noted that the outer edge of the seat 37 is rounded to facilitate the tilting action.

It is intended that the device of the present invention may be made disposable. Tube 12 is preferably of a medical grade polyvinyl. The mouthpiece 13, clips 14 and 22 and the members 32 and 41 of valve 31 are preferably made of a polyethylene material and the flapper 51 of a silicone rubber. The device may be dispensed when a patient enters the hospital and discarded upon discharge.

Clip 22 is installed by the attendant in such position that the mouthpiece 13 is convenient to the patient's mouth at all times. The vessel 11 is filled with water or other liquid and placed on a bedside table or other conveient location. As the patient sucks on the mouthpiece 13, the flapper 51 is tilted from the solid to dot-and-dash line position and liquid is drawn up through the nipple 36 into the body 58 of the valve 31 and thence up through the tube 12. Stops 46 limit upward movement of the flapper 51. When sucking is discontinued, the weight of the liquid and gravity cause the flapper 51 to seat on the seat 37, preventing the liquid in the body 58 and the tube 12 from running out of the valve and back into the vessel. Hence, on subsequent use of the mouthpiece 13 the effort required to raise water to the mouth is greatly diminished.

What is claimed is:

1. A drinking tube having at one end a valve, said valve comprising a casing defining a valve body having top and bottom members defining a valve chamber having a bottom, a top and a vertical wall, an inlet port in said bottom member, said bottom member having a valve seat in registry with said inlet port raised above said bottom, an outlet port in said top member, said tube being connected to said outlet port, a flapper in said chamber having a disk larger than said seat, a lateral extension of said disk near said vertical wall, said extension being formed with opposed cutouts, one of said members having studs extending through said cutouts, a hold down extending from said top member toward but spaced from said bottom member, the lower end of said hold down retaining said extension between said studs, and at least one stop on said top member limiting movement of said flapper beyond open position, said studs confining said flapper from lateral movement away from said vertical wall, said hold down and said valve seat confining said flapper for wobbling movement between a closed position with said disk in sealing contact with said seat an an open position with said disk slanted away from said seat.

2. The combination according to claim 1 which further comprises a container clip, said clip having spaced inner and outer leaves shaped to clip over a liquid container wall, said inner leaf having at least one eye, said tube passing through said eye, said clip holding said tube in position with said valve on the bottom of the container.

3. The combination according to claim 1 which further comprises a fabric attachment clip, said clip having a hole through which said tube may slide and a cardroid opening to engage the fold of a garment or sheet.

* * * * *